United States Patent [19]

Ossfeldt

[11] Patent Number: 4,916,695
[45] Date of Patent: Apr. 10, 1990

[54] STORED PROGRAM CONTROLLED REAL TIME SYSTEM INCLUDING THREE SUBSTANTIALLY IDENTICAL PROCESSORS

[75] Inventor: Bengt E. Ossfeldt, ÄlvsjÖ, Sweden

[73] Assignee: Telefonaktiebolaget L M Ericsson, Stockholm, Sweden

[21] Appl. No.: 176,759

[22] Filed: Apr. 1, 1988

[30] Foreign Application Priority Data

Apr. 16, 1987 [SE] Sweden .................... 8701618

[51] Int. Cl.$^4$ .................... G06F 11/20
[52] U.S. Cl. .................... 371/9.1; 371/68.3
[58] Field of Search ........... 371/9, 16, 68; 364/187, 364/200 MS File

[56] References Cited

U.S. PATENT DOCUMENTS

| | | | |
|---|---|---|---|
| 4,099,241 | 7/1978 | Ossfeldt | 364/200 |
| 4,375,683 | 3/1983 | Wensley | 371/36 |
| 4,400,792 | 8/1983 | Strelow | 371/68 X |
| 4,453,210 | 6/1984 | Suzuki et al. | 364/200 |
| 4,583,224 | 4/1986 | Ishii et al. | 371/36 |
| 4,667,284 | 5/1987 | Asami | 371/9 X |
| 4,773,072 | 9/1988 | Fennel | 371/9 X |

FOREIGN PATENT DOCUMENTS 0190034  8/1986  European Pat. Off.
2093614A  9/1982  United Kingdom.

*Primary Examiner*—Jerry Smith
*Assistant Examiner*—Robert W. Beausoliel
*Attorney, Agent, or Firm*—Burns, Doane, Swecker & Mathis

[57] ABSTRACT

A stored program controlled real time system includes a high-speed executive processor (29) which receives real time signals coming from an equipment (2) and which coacts parallel-synchronously with two substantially identical reserve processors (30, 31). The processors each contain a plurality of function units (3, 5, 6) mutually connected by a data bus (16). For indicating a faulty processor, the system includes a fault localizing means (32) which contains two comparators (34, 36), each of which has two inputs connected to the data buses of the three processors and its outputs connected to three fault indicators (42, 44, 46) each assigned to a processor. The executive processor (29) updates the reserve processors (30, 31) by means of two data transfer channels (33, 35), the inputs of which are connected to the data bus (20) of the executive processor and the outputs of which are connected to the data bus (19) of the respective reserve processors. For compensating the time delays (/d2−d1/), /d3−d1/) forced by the channels in updating, a start pulse source (48) initates the reserve processors with substantially equal time delays, in relation to the executive processor. The data transfer channels (33, 35) used for updating can also be used for fault localization, if the channel outputs are each connected to one of the inputs of each of the comparators (34, 36), the other inputs of which are directly connected each to a data bus (20) of the reserve processors. If the equipment (2) is not capable of reliably sending the real time signals to a reserve processor (31), the signals are transmitted via the executive processor (29) and via the respective data transfer channel (35) to this reserve processor (31) which lacks connection to the equipment.

6 Claims, 2 Drawing Sheets

STORED PROGRAM CONTROLLED REAL TIME SYSTEM INCLUDING THREE SUBSTANTIALLY IDENTICAL PROCESSORS

TECHNICAL FIELD

The present invention relates to a stored program controlled real time system, which includes three substantially identical processors for controlling equipment, e.g. a telecommunication equipment, in parallel-synchronous cooperation.

Two processors constitute first and second reserve processors of the system and a third processor constitutes the executive processor of the system for receiving real time signals from the equipment and transmitting control signals to the equipment. The system further includes a fault localizing means for indicating one of the processors if it produces faulty data, and a timing generator for providing system synchronisation, which is connected to the three processors via a timing bus, as well as a start pulse source for ensuring, by means of a start signal, that the three processors are updated mutually and supplied with the real time signals.

BACKGROUND ART

So-called triple modular reduncance (TMR) is described, e.g., by Michael Ball and Fred Hardie, IBM Corp. Owego, N.Y., in the journal "Computer design" January 1969, pp 50-52. With the aid of the triple hardware redundance there is obtained a modular system, the reliability and fault tolerance of which is greater in certain respects than in a dual redundancy system, which solely includes an executive module, e.g., an executive processor, and a reserve module, e.g., a reserve processor. A dual processor system operating parallelsynchronously is described, e.g., in the U.S. Pat. No. 4 099 241.

As is known, the disadvantages of the dual systems reside in that, due to a comparison between data or control signals produced parallel-synchronously by the executive processor and the reserve processor, it can only be discovered that a fault is present, but, without carrying out time-consuming test programs, there is no possibility of indicating which is the faulty processor. On the other hand, the above-mentioned TMR systems include fault localizing means for indicating one of the three cooperating identical modules if it transmits faulty control signals. In the journal "Electronics", Jan. 27, 1983, pp 98-102, there is described a real time system including three identical control computers, wherein real time signals are distributed to all the computers, and a majority selection is carried out between the control signals, which are generated parallel-synchronously by the previously mutually updated computers. The synchronization of the above mentioned known TMR system relates to the timing in which the modules/computers receive the real time signals and transmit the control signals. The known fault localizing-/majority selection means receive real time/control signals and therefore contain rather complicated circuits, e.g. masking circuits, which per se constitute fault sources.

DISCLOSURE OF INVENTION

In accordance with the invention, the triple redundancy is extended at least so far that high-speed processors constitute the three modules each comprising a plurality of addressable function units and a data bus for high-speed transport of data between the functional units. A TMR system which includes such high-speed processors for single operation and for dual redundancy, known per se from the mentioned U.S. Patent, affords supervision of the real time system on a data bit base. The data bit based supervision, which includes fault discovery and fault diagnosis, is obtained by connecting the fault localizing means via at least two one-way data transfer channels to the high-speed data buses of the three processors. The fault localization is achieved by a few simple binary logical elements which include two comparators and three fault indicators. The transit time of the data transfer channels is observed and the comparators are placed geographically so that parallel-synchronously produced mutually corresponding data bits are compared.

In accordance with the invention, the data transfer channels are not solely used for fault diagnosis, but also for transferring data between the data buses of the processors during an updating period. Such data transfer is needed if the operation of the system with the triple redundancy is built-up starting from a single operation with the aid of the executive processor, thus updating both reserve processors. If a dual redundancy between the executive processor and the first reserve processor is the starting point for the triple redundancy, the second reserve processor is updated with data produced either by the executive processor or the first reserve processor. If the real time system is constructed such that the real time signals coming from the equipment can be solely supplied to the executive processor or solely to the executive processor and one of the reserve processors, selective data transferring between the processors is also required during the operation of the system with the triple redundancy, in order to transfer the real time signals to the reserve processor which is not connected to the equipment.

Attention must be paid to the fact that each processor individually achieves data processing at a rate which is considerably higher than the speed of the real time signals and control signals, and that the data transfer channels required for the redundancy, due to their construction, force on the transferred data definite time delays which are not negligible in relation to the timing pulse phase length generated by the system timing generator and used on the data buses. The U.S. Pat. No. 4,099,241 mentioned in the introduction, describes a delaying means which, at the start of a dual redundancy system, achieves a phase shift such that an instruction is executed in the reserve processor in relation to the corresponding execution by the executive processor, with a time delay being substantially equal to the time delay forced on the data transfer channel. In accordance with the invention, similar phase shifts in the processors' data processing are used in the proposed TMR system for ensuring correct updating and for achieving that the fault localizing means always receives mutually corresponding data bits. The two comparators of the fault localizing means have their respective first inputs connected directly to two of the three data buses of the system, preferably to the data buses of the reserve processors, and their second inputs via the data transfer channels to the third data bus of the system, preferably to the data bus of the executive processor.

The characterizing features of the proposed real time system with triple processor redundancy are disclosed in the accompanying claims.

BRIEF DESCRIPTION OF DRAWINGS

The invention will now be described in more detail with reference to the accompanying drawing, where.

BEST MODE FOR CARRYING OUT THE INVENTION

Figure 1:
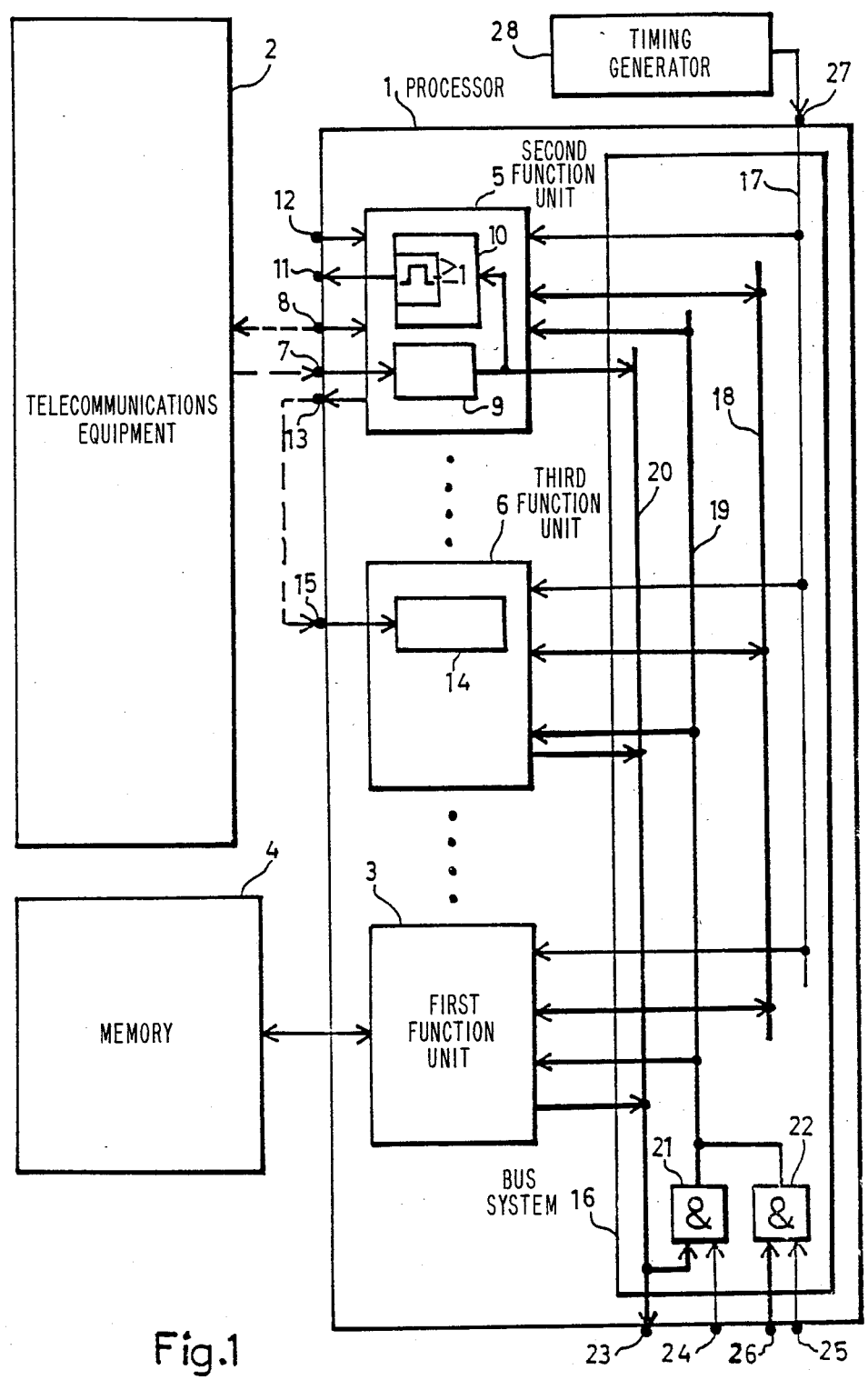
FIG. 1 illustrates a high-speed processor 1, which is connected to a telecommunication equipment 2, to a system memory 4 and to a timing generator 28.

FIG. 1 illustrates a processor 1, e.g., described in the U.S. Pat. Nos 3,631,401 and 4,099,241, the data processing speed of which is great in relation to the speed in which such as a telecommunication equipment 2 transmits real time signals and receives control signals, as well as to the speed in which a first function unit 3 included in the processor, orders a memory means 4 to store such data as the status data of the equipment and to transmit such data to the function unit 3. The high-speed processor includes a plurality of function units, of which a second and a third function unit 5 and 6 are shown further to the mentioned first function unit 3 in FIG. 1.

The second function unit 5 is disposed for receiving real time signals via a first processor input 7 and for sending control signals via a first processor output 8. The signal connections between the telecommunication equipment 2 and said input/output 7/8 are illustrated in FIG. 1 by means of dashed lines since, as it is described later on, all processors in the proposed system with processor redundancy do not necessarily receive the real time signals and since only one of the processors, (hereinafter called the executive processor) sends control signals. It is indicated that the processor input 7 is connected to a conversion register 9 for converting real time signals to data words suited to the high-speed data processing, the outputs of the register 9 each sending a data bit to a first OR gate 10. With the aid of the gate 10, there is obtained, via a second processor output 11, a pulse signal extended on the output side (hereinafter called "real time pulse") as a result of each received real time signal.

The second function unit 5 is further arranged to receive a primary start signal via a second processor input 12, this signal being generated for initiating real time operation with triple redundancy. The primary start signal is necessary if the equipment has previously been controlled by only one processor, for example, which is to be the executive processor in the TMR system. In this case the second function unit 5 processes the primary start signal as a special real time signal, which, due to the real time control in progress, is temporarily interrupted at a time suitable thereto, when it simultaneously sends a secondary start pulse to a third processor output 13.

The third function unit 6 illustrated in FIG. 1 is the one including the instruction registers of the processor, not illustrated in the Figure, for conventionally controlling the high-speed data transfer between the function units, such as a sequence of instruction registers for storing data processing instructions being successively activated due to a received real time signal. It is indicated that the function unit 6 includes a start instruction register 14, which is included in an unillustrated register sequence for starting the processor in a manner suited to the operation of the system with triple redundancy. The start register 14 is activated with the aid of said secondary start impulse which the processor in question receives via a third processor input 15. It is indicated by a dashed line that the output 13 of the executive processor can, in principle, be directly connected to the input 15. Later on there is described in more detail how the system is started for obtaining triple redundancy, and how the secondary start pulse generated by the executive processor being delayed, as well as how the secondary start pulse and the real time pulse obtained via the output 11 is converted to a signal which is hereinafter called "updating signal".

The function units of the processor coact mutually with the aid of a bus system 16, which includes a timing bus 17, and order bus 18 and a data bus which, for more simple explanation, is divided in FIG. 1 into a first one-way bus part 19 for transferring incoming data words to the function units and into a second one-way bus part 20 for transferring data words transmitted by the function units. The first data bus part 19 is connected to the outputs of a first and a second multiple AND gate means 21 and 22. The second data bus part 20 is connected to a fourth processor output 23 and to the input of the first multiple gate 21, which is activated by a supervision signal received via a fourth processor input 24. Thus, the processor processes the data words generated from its own function units only if the multiple gate 21 is activated. The second multiple gate 22, which is activated by an updating signal received via a fifth processor input 25, is arranged such that, in an activated state, it feeds the processor with data words coming via a sixth processor input 26 from the outside.

The timing bus 17 is connected to a timing generator 28 via a seventh processor input 27 for conventionally determining the data processing speed and achieving synchronization between the processors in the proposed TMR real time system. The order bus 18 is used for conventionally addressing the function units and transferring thereto operation codes enabling data words to be received, processed and transmitted.

Figure 2:
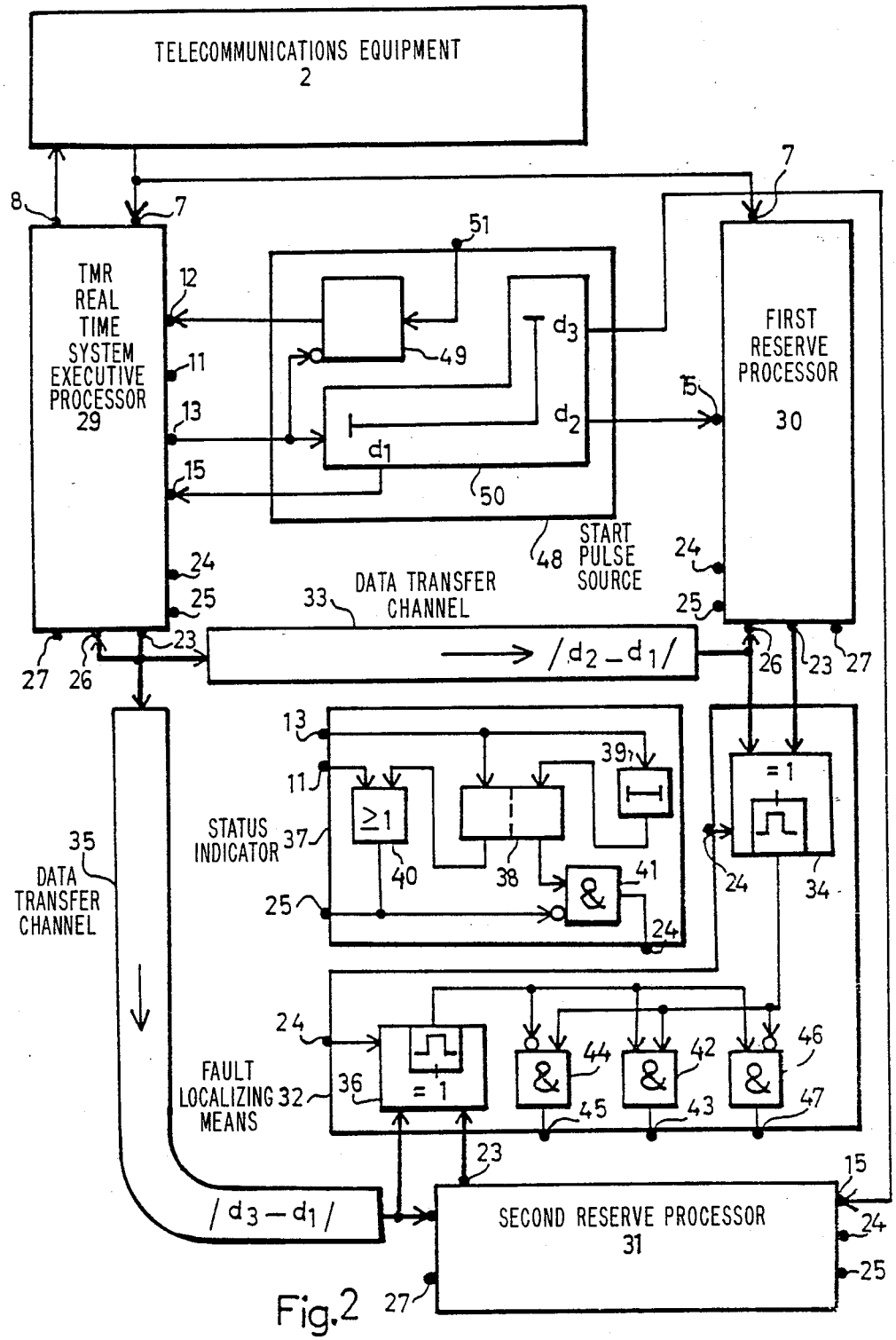
FIG. 2 illustrates a real time system including three substantially identical processors 29–31, and also illustrates that the processor terminals illustrated in FIG. 1 are connected to the telecommunication equipment 2, to a fault localizing means 32 and to a start pulse source 48.

FIG. 2 illustrates a TMR real time system including three substantially identical processors of the type illustrated in FIG. 1. The input and output terminals of the processors have been provided with reference numerals in FIG. 2 which agree with the ones used in FIG. 1 for corresponding terminals. A processor 29 constitutes the TMR real time system executive processor, from the output 8 of which the telecommunication equipment 2 receives control signals. A processor 30 constitutes the first reserve processor of the system. It is assumed that the executive processor and the first reserve processor receive on their inputs 7 the real time signals from the equipment. However, it is assumed in FIG. 2 that the function unit having the reference numeral 5 in FIG. 1 is not used in the second reserve processor 31 of the system, and that the second reserve processor lacks connection to the equipment, and obtains the already converted real time signals via its processor input 26. The executive processor output 23 is connected directly to its own input 26, i.e. its function units receive internally generated data words irrespective of which of their inputs 24 and 25 is activated.

The three processors 29-31 are mutually connected and to a fault localizing means 32 including two comparators, 34 and 36 with the aid of at least two data transfer channels, which, due to their construction, force on the transferred data definite time delays which are not negligible in relation to the timing pulse phase length used on the data buses. The timing pulse is generated by the TMR system timing generator, which is connected to the inputs 27 of the processors. Each comparator has its two inputs connected via at least one data transfer channel to two of the system data buses, such that the comparator definitely does compare the data words transferred on the two buses, these words responding to the execution of mutually corresponding data processing instructions. If the three processors operate exactly in phase, each comparator must be connected to its assigned data buses with the aid of two substantially identical data transfer channels.

In the embodiment illustrated in FIG. 2, the output 23 of the executive processor 29 is connected via a first one-way data transfer channel 33 to the input 26 of the first reserve processor 30 and to one input of the first comparator 34 of the fault localizing means 32, the second input of this comparator 34 being directly connected to the output 23 of the first reserve processor 30. The executive processor 29 is connected via a second one-way data transfer channel 35 to the input 26 of the second reserve processor 31 and to one input of the second comparator 36 of the fault localizing means 32, the second input of the comparator 36 being directly connected to the output 23 of the second reserve processor 31.

During operation of the system with triple redundancy the function units of the reserve processors receive internally generated data words if their inputs 24 are activated with the aid of supervision signals. On the other hand, if the inputs 25 of the reserve processors are activated by updating signals during an updating period, their function units receive data words generated by the executive processor. A minimum of system operational disturbances due to switching on one or two reserve processors with the aid of a secondary start pulse is obtained if the executive processor as quickly as possible after switching on a reserve processor continues to generator control signals and simultaneously updates the reserve processor with the aid of the respective data transfer channel until its function units can reliably generate correct redundant data words with the aid of which the TMR system operation can be supervised.

According to FIG. 2, the real time system includes a status indicator 37, which includes a flip-flop 38 and a first delaying element 39, which receive the secondary start pulse coming from the executive processor output 13. The flip-flop 38 is put in its first or second stable state with the aid of the secondary start pulse which is respectively received directly or is delayed. The first state is transmitted via a second OR gate 40 as an updating signal to the inputs 25 of the processors and to an inverting first input of a first AND gate 41. The second stable state of the flip-flop is transmitted to a second input of the AND gate 41, the output of which is connected to the inputs 24 of the processors. In FIG. 2 these connections to the output 13 of the executive processor and the inputs 24 and 25 of the processors are indicated by an input 13 and outputs 24 and 25 on the status indicator 37.

The delaying time achieved by the first delaying element 39 determines the updating period, i.e. the time sufficient for updating via the associated data transfer channel a newly switched-on reserve processor during concurrent system operation with reduced redundancy. Thereafter, i.e. when the AND gate 41 sends a supervision signal, the data transfer channels 33 and 35 are used (described hereinafter) for carrying out continuous system supervision, and fault localization if one of the three processors of the system generates faulty data words.

The OR gate 40 has its second input connected to the output 11 of the executive processor. This is indicated in FIG. 2 by an input 11 on the status indicator 37. During the updating period a real time pulse transferred via the terminals 11 is inoperative. However, the supervision is temporarily interrupted due to each real time signal processed in the executive processor, and the reserve processors receive the processed real time signal via their inputs 26. The reception and processing of the real time signals by the first reserve processor will thus be inoperative. FIG. 2 describes an embodiment available in practice, the triple redundancy being obtained by an extension of a dual redundancy system solely including the processors 29 and 30, where both processors receive and process the real time signals. If it is desired to use the real time signal processing of the first reserve processor 30 after extending the dual system into a TMR system, the above-mentioned supervision interruption of the first reserve processor is inhibited. On the other hand, if the telecommunication equipment 2 can be loaded so much that the real time signals are also transmitted to the input 7 (unillustrated in FIG. 2) of the reserve processor 31, the supervision interruptions are quite unnecessary, i.e. the TMR system in this case needs no OR gates 10 and 40, no terminals 11 and no AND gate 41. In the embodiment illustrated in FIG. 2, the comparators 34 and 36 of the fault localizing means are placed closely adjacent their respective reserve processors 30 and 31. The comparators, which are activated by means of supervision signals obtained from the AND gate 41, and which carry out logical EX-OR functions, generate logical "1" or logical "0" pulses extended on the output side each time they receive on the input side data bits which are respectively unlike or alike. Due to these pulse extensions it is possible to optionally geographically place three binary logical elements 42, 49 and 46 connected to the outputs of the comparator, these elements functioning as fault indicators.

The fault indicators associated with the fault localizing means 32 include a second AND gate 42 which has its inputs connected to the outputs of the comparators, and consequently generates a warning signal on its fault localizing terminal 43 if a data bit generated by the executive processor does not agree with the corresponding data bits generated parallel-synchronously by the first and second reserve processor, i.e. upon a fault in the executive processor 29. The fault indicators also include a third AND gate 44, which has one input connected to the first comparator 34 and its inverting second input connected to the second comparator 36, and consequently generates a warning signal on its fault localizing terminal 45 if the executive processor 29 and the first reserve processor 30 generate different data bits, while the executive processor 29 and the second reserve processor 31 generate like bits, i.e. upon a fault in the first reserve processor 30. Finally, the fault indicators include a fourth AND gate 46 which has one input connected to the second comparator 36 and its inverting second input connected to the first comparator 34, and consequently generates a warning signal on its fault localizing terminal 47 upon a fault in the second reserve processor 31.

As it has been described above, the data transfer channels 33 and 35 are both used during periods for updating at least one reserve processor and thereafter during periods for supervising the TMR system with the aid of the fault localizing means 32, wherein it must be taken into account that the data transfer channels force channel-characteristic time delays on the transferred data. In a system according to FIG. 2, correct updating and supervision is obtained only if the reserve processors each receives its own secondary start pulse with a phase shift time in relation to the executive processor, this time being substantially the same as the time delay forced on the respective data transfer channel.

FIG. 2 illustrates a start pulse source 48 for generating mutually phaseshifted secondary start pulses, and includes a start signal generator 49 and a second delaying element 50, the output of which are connected to each processor input 15. With the aid of a TMR switching-on pulse received on the terminal 51 of the start pulse source, the start pulse generator is activated to transmit a primary start signal to the input 12 of the executive processor. When the executive processor has been prepared for system control with triple redundancy, it sends on its output 13 a secondary start pulse, which deactivates the start signal generator 49 and which is delayed by means of the second delaying element 50, by first, second and third times d1, d2 and d3. The times d1 and d2 are determined such that the time /d2−d1/ corresponds to the delay forced by the first data transfer channel 33. The times d1 and d3 are determined such that the time /d3−d1/ corrdsponds to the delay which is forced by the second data transfer channel 35. In many cases d1=0 can be realized without risk of operational disturbances in the executive processor 29.

In a TMR system started by phase shifted secondary start pulses according to FIG. 2, where the second reserve processor 31 is not connected to the equipment 2, there are received real time signals which are processed in the executive processor 29 and transferred by the second data transfer channel 35, correctly by the data bus 19 of the second reserve processor, if the real time pulses generated by the OR gate 10 of the executive processor have a length exceeding the time delay /d3−dl/ forced by the second transfer channel. According to a modification unillustrated on the drawing, the real time pulses are realized by tag bits, which together with the processed real time signals are transferred to a reserve processor via the associated data transfer channel and which then control the reserve processor into assuming its updating state for a short time.

If the reserve processors are updated in another embodiment, not illustrated on the drawing, e.g., with the aid of two series-connected data transfer channels, the executions of instructions at the reserve processor connected to the series circuit output must be started in relation to the executive processor so that there is compensation with the aid of the start pulse source for the phase shift time forced by the series circuit.

I claim:

1. A stored program controlled real time system, comprising three substantially identical processors for controlling in parallel-synchronous cooperation of equipment of which two processors constitute first and second reserve processors of the system and a third processor constitutes the executive processor of the system for receiving real time signals from the equipment and transmitting control signals to the equipment, said system further including a fault localizing means for indicating one of the processors if it produces faulty data, and a timing generator for providing system synchronization, which is connected to the three processors via a timing bus, as well as a start pulse source for ensuring, by means of a start signal, that the three processors are updated mutually and supplied with the real time signals, wherein each of the processors contains a plurality of addressable function units and a data bus for transferring data between the function units, the data bus together with said timing bus being included in a bus system for transferring timing pulses and data in periods which are considerably shorter than the periods of said signals, and in that said fault localizing means includes two comparators, which are connected via at least two one-way data transfer channels to the data buses of the three processors.

2. The stored program controlled real time system as claimed in claim 1, wherein the first of said two comparators is connected to the executive processor and to the first reserve processor, the second of said two comparators is connected to the executive processor and to the second reserve processor, and the fault localizing means includes a first and a second fault indicator for indicating a fault in the first and second reserve processor, respectively, and a third fault indicator for indicating a fault in the executive processor, said three indicators each having a first and a second input, respectively, connected to the output of the first and second comparator, respectively.

3. The stored program controlled real time system as claimed in claim 2, wherein said two comparators each include an EX-OR responsive binary logical element, and said three fault indicators
consist of three AND-responsive binary logical elements, the element constituting the first and second fault indicator, respectively, being provided with an inverting input connected to the second and first comparator, respectively.

4. The stored program controlled real time system as claimed in claim 2, further including a status indicator for generating, due to said start signal, at first an updating signal for indicating the system updating status and thereafter a supervision signal for indicating the cooperation of the processors, said status indicator being connected on the output side to the reserve processors such that data transfer between their own function units is inhibited by the updating signal ad is permitted by the supervision signal, and being connected to the fault localizing means such that the comparators are activated by the supervision signal.

5. The stored program controlled real time system as claimed in claim 4, further comprising a first and a second data transfer channel, respectively, which impose on the transferred data a first and second time delay, respectively, which are not negligible in relation to the timing pulse period generated by the timing generator and used on the bus system, said first transfer channel having an input connected to the data bus of the executive processor and an output connected to the data bus of the first reserve processor and said second transfer channel having an input connected to the data bus of the executive processor and an output connected to the data bus of the second reserve processor, if they obtain the updating signal from the status indicator, and said transfer channels having their outputs further connected to the first input of the first and second comparator, respectively, of the fault localizing means, the second comparator input being directly connected to the data bus of the first and second reserve processors, respectively, and said start pulse source includes a delay means for initiating the first and second reserve processors, in relation to the executive processor, with a time delay substantially equal to said first and second channel characteristic time delay, respectively.

6. The stored program controlled real time system as claimed in claim 5, wherein said status indicator includes an interrupter element for temporarily interrupting the supervision signal, and the executive processor includes a real time pulse generator for generating real time pulses, each associated with a real time signal processed for transfer on the data bus included in the executive processor, said real time pulse generator having an output connected to said interrupter element and to at least one reserve processor which lacks connection to the equipment, such that this reserve processor receives each real time pulse as a shortduration updating signal, due to which the associated real time signal is transferred to the data bus of this reserve processor via the second data transfer channel.

* * * * *